US012558661B2

(12) United States Patent
Rodriguez

(10) Patent No.: US 12,558,661 B2
(45) Date of Patent: Feb. 24, 2026

(54) VAPOR DELIVERY APPARATUS, ASSOCIATED VAPOR PHASE REACTOR AND METHODS OF USE

(71) Applicant: ASM IP Holding B.V., Almere (NL)

(72) Inventor: Leonard Rodriguez, Phoenix, AZ (US)

(73) Assignee: ASM IP Holding B.V., Almere (NL)

( * ) Notice: Subject to any disclaimer, the term of this patent is extended or adjusted under 35 U.S.C. 154(b) by 100 days.

(21) Appl. No.: 18/378,222

(22) Filed: Oct. 10, 2023

(65) Prior Publication Data

US 2024/0123416 A1 Apr. 18, 2024

Related U.S. Application Data

(60) Provisional application No. 63/415,901, filed on Oct. 13, 2022.

(51) Int. Cl.
*B01J 8/18* (2006.01)
*B01J 8/24* (2006.01)

(52) U.S. Cl.
CPC .............. *B01J 8/1809* (2013.01); *B01J 8/24* (2013.01); *B01J 2219/00209* (2013.01); *B01J 2219/00225* (2013.01); *B01J 2219/00761* (2013.01)

(58) Field of Classification Search
CPC .......... C23C 16/4481; C23C 16/45544; C23C 16/45561; C23C 16/54; C23C 16/52; C23C 16/4401; C23C 16/455; C23C 16/448; C23C 16/4485; C23C 16/45557;

H01L 21/67144; H01L 21/67253; B01J 8/1809; B01J 8/24; B01J 2219/00209; B01J 2219/00225; B01J 2219/00761
See application file for complete search history.

(56) References Cited

U.S. PATENT DOCUMENTS

| | | |
|---|---|---|
| 3,113,140 A | 12/1963 | Matz |
| 4,336,227 A | 6/1982 | Koyama |
| 4,397,267 A | 8/1983 | Fink |
| 4,421,523 A | 12/1983 | Mehta |
| 4,437,416 A | 3/1984 | Ishii |
| 4,858,144 A | 8/1989 | Marsaly |
| 5,284,676 A | 2/1994 | Accuntius |
| 5,328,713 A | 7/1994 | Emken |
| 5,435,972 A | 7/1995 | Daw |
| 5,579,588 A | 12/1996 | Reh |
| 5,685,640 A | 11/1997 | Goedicke |
| 5,752,327 A | 5/1998 | Biallas |
| 6,274,191 B1 | 8/2001 | Emken |
| 6,301,546 B1 | 10/2001 | Weinstein |
| 6,513,376 B1 | 2/2003 | Prather et al. |

(Continued)

FOREIGN PATENT DOCUMENTS

| | | |
|---|---|---|
| EP | 0305857 A2 | 3/1989 |
| EP | 1717203 A1 | 11/2006 |

(Continued)

*Primary Examiner* — Michael G Miller

(74) *Attorney, Agent, or Firm* — Snell & Wilmer L.L.P.

(57) ABSTRACT

Vapor delivery apparatus configured for generating a gaseous precursor from solid source precursor particles in a fluidized bed are disclosed. In addition, vapor phase reactors including a vapor delivery apparatus including a fluidized bed of solid precursor are also disclosed. Methods for monitoring and a controlling a vapor delivery system including a fluidized bed also disclosed.

20 Claims, 4 Drawing Sheets

(56)  References Cited

U.S. PATENT DOCUMENTS

| | | | |
|---|---|---|---|
| 6,596,084 | B1 | 7/2003 | Patke |
| 6,777,029 | B2 | 8/2004 | Carnagey, Sr. |
| 7,428,373 | B2 | 9/2008 | Sandhu |
| 7,566,477 | B2 | 7/2009 | Brcka |
| D614,153 | S | 4/2010 | Fondurulia |
| 7,723,700 | B2 | 5/2010 | Horsky |
| 8,137,462 | B2 | 3/2012 | Fondurulia |
| 8,292,977 | B2 | 10/2012 | Suda |
| 8,343,583 | B2 | 1/2013 | Jan Snijders |
| 8,452,547 | B2 | 5/2013 | Bhusarapu |
| 8,776,821 | B2 | 7/2014 | Woelk |
| 8,821,640 | B2 | 9/2014 | Cleary |
| 8,849,584 | B2 | 9/2014 | Bhusarapu |
| 8,871,153 | B2 | 10/2014 | Dassel |
| 8,986,456 | B2 | 3/2015 | Fondurulia |
| 9,359,668 | B2 | 6/2016 | Xiong |
| 9,452,403 | B2 | 9/2016 | Chew |
| 9,587,993 | B2 | 3/2017 | Miller |
| 9,701,906 | B2 | 7/2017 | Brown |
| 10,267,768 | B2 | 4/2019 | Beccard |
| 10,415,822 | B2 | 9/2019 | Ryu |
| 11,066,308 | B2 | 7/2021 | Mcgee |
| 11,117,112 | B2 | 9/2021 | Brown |
| 11,168,394 | B2 | 11/2021 | Woelk |
| 2008/0268143 | A1 | 10/2008 | Vahlas |
| 2010/0009080 | A1* | 1/2010 | Jan Snijders ....... C23C 16/4481 |
| | | | 427/255.28 |
| 2010/0037805 | A1 | 2/2010 | Itapelto |
| 2014/0124064 | A1 | 5/2014 | Hidaka |
| 2017/0335450 | A1 | 11/2017 | Collins et al. |
| 2018/0051373 | A1 | 2/2018 | Dassel |
| 2020/0306712 | A1* | 10/2020 | Brown .................... B01J 8/003 |
| 2021/0010849 | A1 | 1/2021 | Laws |
| 2021/0087679 | A1 | 3/2021 | Winkler |
| 2022/0042174 | A1 | 2/2022 | Woelk |
| 2023/0173447 | A1 | 6/2023 | Karimipour |
| 2023/0220989 | A1 | 7/2023 | Kettunen |

FOREIGN PATENT DOCUMENTS

| | | |
|---|---|---|
| JP | 7272563 B2 | 5/2023 |
| KR | 100204110 B1 | 6/1999 |
| KR | 101822117 B1 | 1/2018 |
| KR | 102535871 B1 | 5/2023 |
| WO | 9325304 A1 | 6/1992 |
| WO | 2016069467 A1 | 5/2016 |

* cited by examiner

400

VAPOR DELIVERY APPARATUS, ASSOCIATED VAPOR PHASE REACTOR AND METHODS OF USE

CROSS-REFERENCE TO RELATED APPLICATIONS

This application is a nonprovisional of, and claims priority to and the benefit of, U.S. Provisional Patent Application No. 63/415,901, filed Oct. 13, 2022 and entitled "VAPOR DELIVERY APPARATUS AND ASSOCIATED VAPOR PHASE REACTOR AND METHODS OF USE," which is hereby incorporated by reference herein.

FIELD OF INVENTION

The present disclosure generally relates to the field of semiconductor processing apparatus and methods. In particular, the present disclosure generally relates to vapor delivery apparatus, associated vapor phase reactors, as well as methods of use of said apparatus.

BACKGROUND OF THE DISCLOSURE

The fabrication of semiconductor devices and integrated circuits often requires the vapor deposition of materials onto suitable substrates. For example, vapor deposition methods may include, but are not limited to, chemical vapor deposition (CVD) and atomic layer deposition (ALD). The expansion of suitable source materials for vapor deposition has increasingly led to the use of source materials that are naturally solids at room temperature and atmospheric pressure.

In order to effectively deposit materials using gaseous precursors generated from a solid source, the solid material must be vaporized. In pursuit of this goal, a vapor delivery apparatus can be used to effectuate the vaporization of the solid source material. For example, such vapor delivery apparatus can employ one or more heat sources to increase the vapor pressure of the solid source material.

Unfortunately, existing vapor delivery apparatus can have a number of shortcomings. For example, a vapor delivery system configured for vaporizing a solid source may provide an inadequate ratio of solid source surface area to the desired vapor volume, and/or poor carrier gas/source material contact time. In addition, current vapor delivery systems can allow a carrier gas to flow from the inlet to the outlet of the vapor delivery apparatus without intimately contacting the solid source material, thus preventing the carrier gas from becoming saturated with the precursor vapor.

In addition, vapor delivery apparatus are often configured with subsystems to determine the remaining weight of the source material within the apparatus during operation. Determining the remaining weight of the source material is desirable in order to determine when a refill of the source material is required. In addition, determining the remaining weight of source material can prevent the possibility of processing wafers with an empty, or near empty source, which can result in production losses, wafer scrappage, and associated financial losses. Therefore apparatus, systems, and methods are desirable to enable efficient vaporization of a solid source material whilst effectively monitoring the weight of solid source remaining within the evaporation system.

Any discussion, including discussion of problems and solutions, set forth in this section has been included in this disclosure solely for the purpose of providing a context for the present disclosure. Such discussion should not be taken as an admission that any or all of the information was known at the time the invention was made or otherwise constitutes prior art.

SUMMARY OF THE DISCLOSURE

This summary may introduce a selection of concepts in a simplified form, which may be described in further detail below. This summary is not intended to necessarily identify key features or essential features of the claimed subject matter, nor is it intended to be used to limit the scope of the claimed subject matter.

A vapor apparatus is provided. The vapor delivery apparatus is configured for converting a solid source material to a gaseous precursor for use in a vapor phase reactor. The vapor delivery apparatus comprises, a vessel comprising a vessel interior, a fluidized bed region disposed within the vessel interior, the fluidized bed region configured for containing a plurality of solid precursor particles, a heating system configured for heating the fluidized bed region, a pressure sensing system constructed and arranged to generate a differential pressure signal (APs) by monitoring a pressure drop ($\Delta P$) across the plurality of solid precursor particles when a carrier gas flows upwards through the plurality of solid precursor particles to form a fluidized bed within the fluidized bed region; and a control system constructed and arranged to receive the differential pressure signal ($\Delta P$) from the pressure sensing system and calculate a remaining weight (W) of the plurality of solid precursor particles within the fluidized bed region.

In addition to one or more of the features described above, or as an alternative, further examples may include that the pressure sensing system comprises two pressure sensors, a first pressure sensor disposed upstream of the fluidized bed region and a second pressure sensor disposed downstream of the fluidized bed region.

In addition to one or more of the features described above, or as an alternative, further examples may comprise that the pressure sensing system comprises a differential pressure sensor comprising two ports, a first port fluidly coupled upstream of the fluidized bed region and a second port fluidly coupled downstream of the fluidized bed region.

In addition to one or more of the features described above, or as an alternative, further examples may comprise, an alert system linked to the control system, wherein the alert system is configured to be activated by an alert signal generated from the control system when the remaining weight of the plurality of solid precursor particles within the source vessel reaches a predetermined minimum value.

In addition to one or more of the features described above, or as an alternative, further examples may comprise, a low-pass filter configured to reduce fluctuations in the differential pressure signal ($\Delta P_s$).

In addition to one or more of the features described above, or as an alternative, further examples may comprise that the low-pass filter comprises at least one of a buffer volume disposed downstream of the source vessel, or an electrical circuit disposed within the control system.

In addition to one or more of the features described above, or as an alternative, further examples may comprise, a carrier gas inlet and a distribution plate disposed upstream of the fluidized bed region.

In addition to one or more of the features described above, or as an alternative, further examples may comprise, a filter disposed downstream of the fluidized bed region and configured to filter solid precursor particles from the generated gaseous precursor.

In addition to one or more of the features described above, or as an alternative, further examples may comprise, a vapor phase reactor in fluid communication with the vapor delivery apparatus.

A vapor phase reactor is also provided. The vapor phase reactor is configured for vapor processing of substrates, and includes a vapor delivery apparatus. The vapor delivery apparatus comprises, a carrier gas inlet, a fluidized bed region disposed within an inner volume of the vapor delivery apparatus, the fluidized bed region constructed and arranged to allow a carrier gas to lift and stir a plurality of solid precursor particles to form a fluidized bed, a heater configured to heat the fluidized bed region, a precursor gas outlet disposed downstream of the fluidized bed region, a pressure sensing system constructed and arranged to monitor a pressure drop ($\Delta P$) across the fluidized bed and generate a differential pressure signal ($\Delta P_s$) from said pressure drop, and a vapor phase reaction chamber in fluid communication with the vapor delivery apparatus, wherein the vapor phase reaction chamber is configured to receive a gaseous precursor generated in the vapor delivery apparatus, a reactor control system constructed and arranged to receive the differential pressure signal ($\Delta P_s$) from the pressure sensing system and calculate a remaining weight of the fluidized bed, and an alert system linked to the reactor control system, wherein the alert system is configured to be activated by a signal generated from the reactor control system when the weight of the fluidized bed reaches a predetermined minimum value.

In addition to one or more of the features described above, or as an alternative, further examples may comprise, a low-pass filter configured to reduce fluctuations in the differential pressure signal ($\Delta P$).

In addition to one or more of the features described above, or as an alternative, further examples may comprise that the low-pass filter comprises at least one of a buffer volume disposed upstream of the source vessel, or an electrical circuit disposed within the control unit.

A method for monitoring and controlling a vapor delivery system is also provided. The method comprises, flowing a carrier gas upward through a plurality of solid source particles to form a fluidized bed with an initial bed weight, generating a gaseous precursor from the fluidized bed by vaporizing a portion of the plurality of solid source particles, monitoring a pressure differential ($\Delta P$) across the fluidized bed as the gaseous precursor is generated, calculating the remaining bed weight within the fluidized bed as the bed weight reduces as a result of the vaporization of a portion of the plurality of solid source particles, and activating an alert system when the remaining bed weight is less than a predetermining minimum value.

In addition to one or more of the processes described above, or as an alternative, further examples may comprise, monitoring the differential pressure ($\Delta P$) across the fluidized bed which comprises monitoring the differential pressure ($\Delta P$) utilizing a pressure sensing system.

In addition to one or more of the processes described above, or as an alternative, further examples may comprise that the pressure sensing system comprises at least two pressure sensors, a first pressure sensor disposed upstream of the fluidized bed and a second pressure sensor disposed downstream of the fluidized bed.

In addition to one or more of the processes described above, or as an alternative, further examples may comprise that the pressure sensing system comprises a differential pressure sensor comprising two ports, a first port fluidly coupled upstream of the fluidized bed and a second port fluidly coupled downstream of the fluidized bed.

In addition to one or more of the processes described above, or as an alternative, further examples may comprise that calculating the remaining bed weight within the fluidized bed as the bed weight reduces is performed by a control system in communication with the pressure sensing system.

In addition to one or more of the processes described above, or as an alternative, further examples may comprise that activating the alert system initiates one or more further processes, said processes comprising, initiating a refill of the vapor delivery system with additional solid precursor particles, or discontinuing gaseous precursor generation.

In addition to one or more of the processes described above, or as an alternative, further examples may comprise employing a low-pass filter to reduce any fluctuations in the monitored differential pressure ($\Delta P$).

In addition to one or more of the processes described above, or as an alternative, further examples may comprise that the low-pass filter comprises at least one of a buffer volume disposed upstream of the source vessel, or an electrical circuit disposed within the control system.

These and other embodiments will become readily apparent to those skilled in the art from the following detailed description of certain embodiments having reference to the attached figures. The invention is not being limited to any particular embodiments disclosed.

BRIEF DESCRIPTION OF THE DRAWING FIGURES

A more complete understanding of the embodiments of the present disclosure may be derived by referring to the detailed description and claims when considered in connection with the following illustrative figures.

Figure 1:
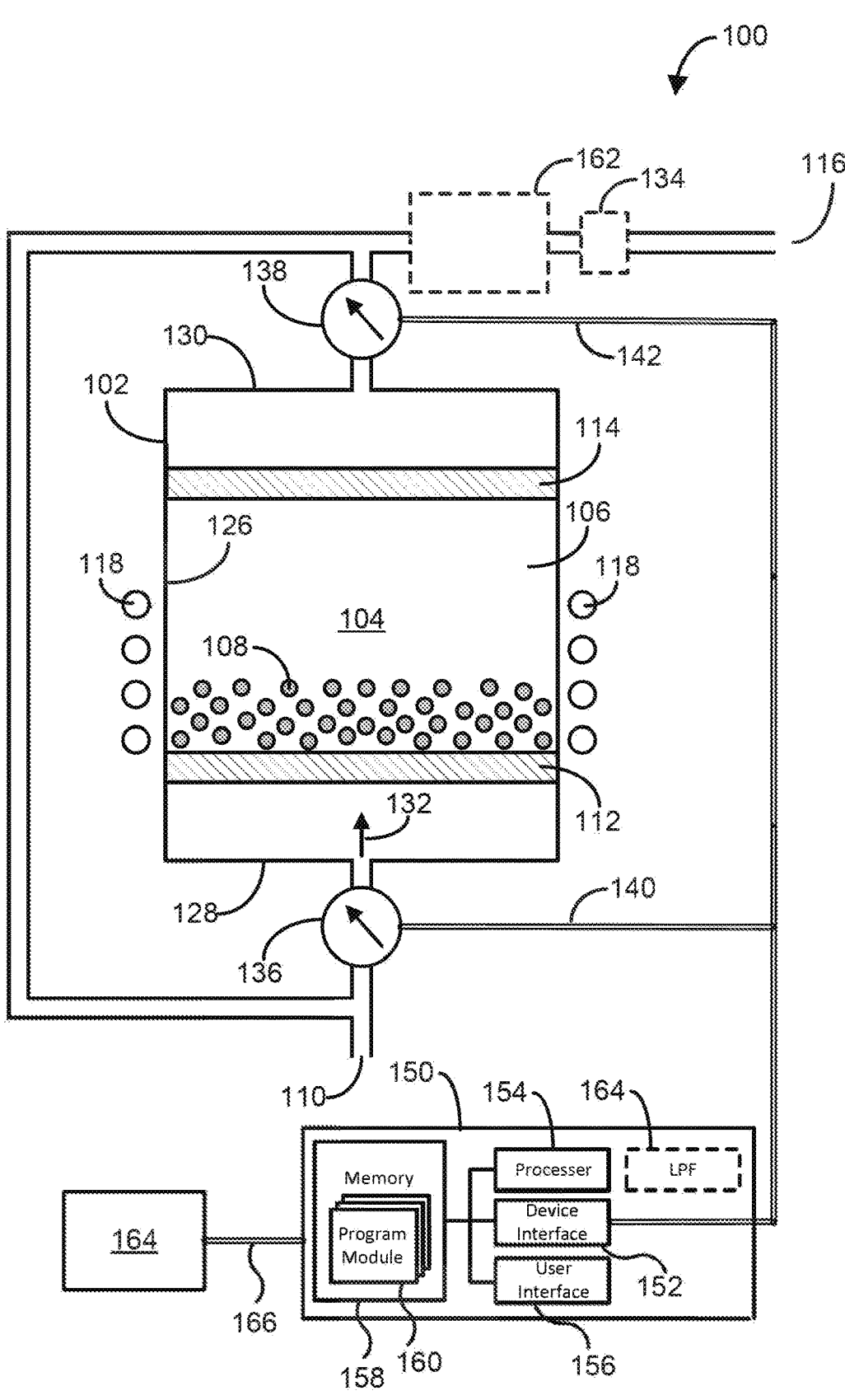
FIG. 1 illustrates an exemplary vapor delivery apparatus in accordance with exemplary embodiments of the disclosure.

It will be appreciated that elements in the figures are illustrated for simplicity and clarity and have not necessarily been drawn to scale. For example, the dimensions of some of the elements in the figures may be exaggerated relative to other elements to help improve understanding of illustrated embodiments of the present disclosure.

DETAILED DESCRIPTION OF EXEMPLARY EMBODIMENTS

The description of exemplary embodiments of methods, structures, devices, and apparatus provided below is merely exemplary and is intended for purposes of illustration only; the following description is not intended to limit the scope of the disclosure or the claims. Moreover, recitation of multiple embodiments having stated features is not intended to exclude other embodiments having additional features or other embodiments incorporating different combinations of the stated features. For example, various embodiments are set forth as exemplary embodiments and may be recited in the dependent claims. Unless otherwise noted, the exemplary embodiments or components thereof may be combined or may be applied separate from each other.

In this disclosure, "gas" can include material that is a gas at normal temperature and pressure (NTP), a vaporized solid and/or a vaporized liquid, and can be constituted by a single gas or a mixture of gases, depending on the context. A gas other than the process gas, i.e., a gas introduced without passing through a gas distribution assembly, other gas distribution device, or the like, can be used for, e.g., sealing the reaction space, and can include a seal gas. Precursors and reactants can be gases. Exemplary seal gases include noble gases, nitrogen, and the like. In some cases, the term "precursor" can refer to a compound that participates in the chemical reaction that produces another compound, and particularly to a compound that constitutes a film matrix or a main skeleton of a film; the term "reactant" can be used interchangeably with the term precursor.

As used herein, the term "substrate" can refer to any underlying material or materials that can be used to form, or upon which, a device, a circuit, a layer, or a film can be formed by means of a method according to an embodiment of the present disclosure. A substrate can include a bulk material, such as silicon (e.g., single-crystal silicon), other Group IV materials, such as germanium, or other semiconductor materials, such as Group II-VI, Group III-V, or Group IV-IV semiconductor materials, and can include one or more layers overlying or underlying the bulk material. Further, the substrate can include various features, such as recesses, protrusions, and the like formed within or on at least a portion of a layer of the substrate. By way of example, a substrate can include bulk semiconductor material and an insulating or dielectric material layer overlying at least a portion of the bulk semiconductor material. Further, the term "substrate" may refer to any underlying material or materials that may be used, or upon which, a device, a circuit, or a film may be formed. The "substrate" may be continuous or non-continuous; rigid or flexible; solid or porous. The substrate may be in any form such as a powder, a plate, or a workpiece. Substrates in the form of a plate may include wafers in various shapes and sizes. Substrates may be made from materials, such as silicon, silicon germanium, silicon oxide, gallium arsenide, gallium nitride and silicon carbide for example. A continuous substrate may extend beyond the bounds of a process chamber where a deposition process occurs and may move through the process chamber such that the process continues until the end of the substrate is reached. A continuous substrate may be supplied from a continuous substrate feeding system allowing for manufacture and output of the continuous substrate in any appropriate form. Non-limiting examples of a continuous substrate may include a sheet, a non-woven film, a roll, a foil, a web, a flexible material, a bundle of continuous filaments or fibers (i.e., ceramic fibers or polymer fibers). Continuous substrates may also comprise carriers or sheets upon which non-continuous substrates are mounted.

As used herein, the term "film" and/or "layer" can refer to any continuous or non-continuous structure and material, such as material deposited by the methods disclosed herein. For example, a film and/or layer can include two-dimensional materials, three-dimensional materials, nanoparticles, partial or full molecular layers or partial or full atomic layers or clusters of atoms and/or molecules. A film or layer may comprise, or may consist at least partially of, a plurality of dispersed atoms on a surface of a substrate and/or may be or may become embedded in a substrate and/or may be or may become embedded in a device manufactured on that substrate. A film or layer may comprise material or a layer with pinholes and/or isolated islands. A film or layer may be at least partially continuous. A film or layer may be patterned, e.g. subdivided, and may be comprised in a plurality of semiconductor devices. A film or layer may be selectively grown on some parts of a substrate, and not on others.

The term "deposition process" as used herein can refer to the introduction of precursors (and/or reactants) into a reaction chamber to deposit a layer over a substrate. "Cyclical deposition processes" are examples of "deposition processes".

The term "cyclic deposition process" or "cyclical deposition process" can refer to the sequential introduction of precursors (and/or reactants) into a reaction chamber to deposit a layer over a substrate and includes processing techniques such as atomic layer deposition (ALD), cyclical chemical vapor deposition (cyclical CVD), and hybrid cyclical deposition processes that include an ALD component and a cyclical CVD component.

The term "atomic layer deposition" can refer to a vapor deposition process in which deposition cycles, typically a plurality of consecutive deposition cycles, are conducted in a process chamber. The term atomic layer deposition, as used herein, is also meant to include processes designated by related terms, such as chemical vapor atomic layer deposition, atomic layer epitaxy (ALE), molecular beam epitaxy (MBE), gas source MBE, organometallic MBE, and chemical beam epitaxy, when performed with alternating pulses of precursor(s)/reactive gas(es), and purge (e.g., inert carrier) gas(es). A pulse can comprise exposing a substrate to a precursor or reactant. This can be done, for example, by introducing a precursor or reactant to a reaction chamber in which the substrate is present. Additionally or alternatively, exposing the substrate to a precursor can comprise moving the substrate to a location in a substrate processing system in which the reactant or precursor is present.

Generally, for ALD processes, during each cycle, a precursor is introduced into a reaction chamber and is chemisorbed onto a deposition surface (e.g., a substrate surface that can include a previously deposited material from a previous ALD cycle or other material) and forming about a monolayer or sub-monolayer of material that does not readily react with additional precursor (i.e., a self-limiting reaction). Thereafter, a reactant (e.g., another precursor or reaction gas) may subsequently be introduced into the process chamber for use in converting the chemisorbed precursor to the desired material on the deposition surface. The reactant can be capable of further reaction with the precursor. Purging steps can be utilized during one or more cycles, e.g., during each step of each cycle, to remove any excess precursor from the process chamber and/or remove any excess reactant and/or reaction byproducts from the reaction chamber.

The term "fluidized bed" as used herein can refer to a plurality of solid precursor particles (also referred to as a "bed" of particles) held within a vessel and induced into a fluidized state by an upward flow of gas. A fluidized state can be achieved when the upward flow rate of gas is such that the drag forces on the plurality of particles equals the weight of the particles. This gas flow rate is commonly referred to as the minimum fluidization velocity and when the minimum fluidization velocity is reached, the solid particles start floating, moving chaotically and colliding. Above the minimum fluidization velocity the pressure drop ($\Delta P$) across the fluidized bed is directly proportional to the weight of the remaining particles within the fluidized bed.

The term "fluidized bed pressure differential" or "fluidized bed pressure drop" as used herein can refer to the pressure drop ($\Delta P$) across the fluidized bed when the flow rate of the upward gas through the plurality of solid particles is at or above the minimum fluidization velocity.

The term "bed weight" or "weight of the fluidized bed" (W) as used herein can refer to the weight of, or the remaining weight of, solid precursor particles within the fluidized bed.

Further, in this disclosure, any two numbers of a variable can constitute a workable range of the variable, and any ranges indicated may include or exclude the endpoints. Additionally, any values of variables indicated (regardless of whether they are indicated with "about" or not) may refer to precise values or approximate values and include equivalents, and may refer to average, median, representative, majority, or the like. Further, in this disclosure, the terms "including," "constituted by" and "having" refer independently to "typically or broadly comprising," "comprising," "consisting essentially of," or "consisting of" in some embodiments. In this disclosure, any defined meanings do not necessarily exclude ordinary and customary meanings in some embodiments.

In the specification, it will be understood that the term "on" or "over" may be used to describe a relative location relationship. Another element, film or layer may be directly on the mentioned layer, or another layer (an intermediate layer) or element may be intervened therebetween, or a layer may be disposed on a mentioned layer but not completely cover a surface of the mentioned layer. Therefore, unless the term "directly" is separately used, the term "on" or "over" will be construed to be a relative concept. Similarly to this, it will be understood the term "under", "underlying", or "below" will be construed to be relative concepts.

The present disclosure may include vapor delivery apparatus adapted for converting a solid source to a gaseous precursor. The disclosure may also include vapor phase reactors including a vapor delivery apparatus employing a fluidized bed and systems for monitoring said fluidized bed. The disclosure also includes methods for monitoring solid source depletion within a vapor delivery apparatus employing a fluidized bed.

In more detail, employing solid sources for the generation of gaseous precursors in vapor phase deposition systems and processes can introduce a number of technical challenges. For example, the generation of sufficient vapor from a solid source can be complex. In addition, monitoring the depletion and hence the remaining weight of a solid source within the evaporation vessel during operation can be challenging. Liquid sources may avoid both of said problems due to the inherent rapid evaporation rates of liquid sources as well as liquids innately having a volume that fluidly changes depending on the remaining quantity of liquid source in the source vessel. However, suitable liquid sources may not always be available for the deposition of a certain desired material either due to a lack of the desired element in the source or due to the hazardous nature of the liquid source or other detrimental properties of the liquid source.

For solid precursors, the problem of insufficient vapor generation may be addressed by enhancing evaporation rates through increasing the exposed surface area of the solid source in contact with both a carrier gas flow and a heat source. However, apparatus, system, and methods are desirable to not only increase solid source evaporation rates but also provide a mechanism for monitoring the depletion and hence determining the remaining quantity of a solid source within a vapor delivery apparatus.

Therefore, the current disclosure includes vapor delivery apparatus and vapor phase reactors supplied with precursor from said vapor delivery apparatus.

In some embodiment, the vapor delivery apparatus can include, a vessel comprising a vessel interior and a fluidized bed region disposed within the vessel interior, the fluidized bed region being configured for containing a plurality of solid precursor particles. The vapor delivery apparatus can also include, a heating system configured for heating the fluidized bed region, and a pressure sensing system constructed and arranged to generate a differential pressure signal ($\Delta P_s$) by monitoring a pressure drop ($\Delta P$) across the plurality of solid precursor particles when a carrier gas flows upwards through the plurality of solid precursor particles to form a fluidized bed within the fluidized bed region. The vapor delivery apparatus can also include, a control system constructed and arranged to receive the differential pressure signal ($\Delta P_s$) from the pressure sensing system and calculate a remaining weight (W) of the plurality of solid precursor particles within the fluidized bed region.

Therefore, the embodiments of the disclosure describe a vapor delivery apparatus and particular a vapor delivery apparatus comprising a fluidized bed configured for converting a solid source material to a gaseous precursor for use in a vapor phase reactor.

As described previously, the use of solid source materials in vapor phase reactors can be impacted by the fact that the majority of suitable solid materials exhibit low vapor pressures. These low vapor pressures can in turn limit the evaporation rate possible from the solid source material and hence impact the ultimate flow rate of a gaseous precursor generated from said solid source material. A method to increase the evaporation rate from a solid material is to increase the surface area of the solid, such that, an increased portion of the heated solid is able to contact a carrier gas and therefore a larger portion of evaporated solid can become entrained within the carrier gas.

The embodiments of the present disclosure, employ a fluidized bed to increase the surface area of a solid source material. In a fluidized bed, the surface area of the solid source is increased by employing a solid source in the form of a plurality of solid precursor particles. Solid precursor particles inherently have a greater surface area for a given weight compared with an equivalent weight of bulk solid material. In addition, a fluidized bed can elevate and mix the plurality of solid precursor particles ensuring continuous surface exposure of the solid source particles to both a heating system and the incoming carrier gas, thereby further improving evaporation rates and production of the gaseous precursor.

FIG. 1 illustrates an exemplary vapor delivery apparatus 100 of the present disclosure. In brief, the vapor delivery apparatus 100 comprises a vessel 102 which includes a fluidized bed region 104 disposed within the vessel interior 106. The fluidized bed region 104 can be constructed and arranged so as to hold and contain a plurality of solid precursor particles 108. In addition, the fluidized bed region 104 can be constructed and arranged (along with additional components) to enable fluidization of the plurality of solid particles 108 resulting in a fluidized bed within the vessel interior 106. It should be noted that the plurality of precursor particles 108 as illustrated in FIG. 1 are shown in a fluidized state, i.e., a non-static state. Exemplary vapor delivery apparatus 100 can also include a carrier gas inlet 110 and a distributor plate 112, the distributor plate 112 being disposed downstream of the carrier gas inlet 110. In addition, a filter 114 can be disposed downstream of the fluidized bed region 104 and a precursor gas outlet 116 can be disposed downstream of the filter 114. As used herein, the terms "upstream" and "downstream" relate to the direct of gas flow through the apparatus as described herein, "downstream" being in the direction of carrier gas flow, and "upstream" being in the opposite direction to the carrier gas flow The exemplary vapor delivery apparatus 100 can further include a heating system 118 constructure, arranged, and configured to heat the fluidized bed region 104 and hence the plurality of solid precursor particles 108 disposed within the vessel interior 106. The exemplary vapor delivery apparatus 100 can further include a pressure sensing system, illustrated in part by pressure sensors 136 and 138 in the example embodiment of FIG. 1, as well a control system 150 and alert system 160.

In more detail, the illustrated vessel 102 includes a sidewall 126, a bottom plate 128, and a top plate 130, wherein the sidewall 126 surrounds the fluidized bed region 104 within the vessel interior 106. In some embodiments of the disclosure, the vessel 102 may have a cylindrical (i.e., tubular) shape, however in alternative embodiments the vessel 102 may take other forms. The vessel 102 can have a well-defined interior cross sectional area over portions of its extent. For example, the cross sectional area of the vessel interior 106 throughout the fluidized bed region 104 can be well defined as having a cross sectional area (A) to enable the formation of a fluidized bed with well-established dimensions.

The solid source material utilized within exemplary vapor delivery apparatus 100 may comprise a plurality of solid precursor particles 108. As a non-limiting example, the solid precursor particles may comprise a plurality of solid particles of hafnium chloride (HfCl$_4$), zirconium chloride (ZrCl$_4$), aluminum chloride (AlCl$_3$), or a molybdenum chloride (such as, MoCl$_5$, MoO$_2$Cl$_2$, or MoOCl$_5$, for example). In some embodiments, the plurality of solid particles can be in a form of a powder, beads, cylinders, rods, filaments, fibers, etc.

The fluidized bed region 104 within the vessel interior 106 is a region configured for containing the plurality of solid precursor particles 108 as well as being constructed and arranged (along with additional components) to enable the formation of a fluidized bed from the plurality of solid precursor particles 108. In some embodiments, the fluidized bed region 104 can be defined as the region within the vessel interior 106 in which a fluidized bed can be formed, maintained, and controlled. As a non-limiting example and as illustrated in FIG. 1, the fluidized bed region 104 can extend from the upper surface of the distributor plate 112, up to and including the lower surface of the filter 114.

As previously stated, the term "fluidized bed" can refer to a bed of solid precursor particles, with a flow of carrier gas passing upwards through the solid particles at a flow rate capable of lifting and setting the particles in motion. In such a state, gravity balances with the viscous forces in the carrier gas flow to form a fluid-like state where intermixing between the solid precursor particles and the carrier gas is intense. A fluidized bed is formed when the carrier gas flow rate increases and particles move apart. In the fluidized state, the solid particles may visibly vibrate and move about and some or all of the solid precursor particles can be suspended. It should be noted that the carrier gas flow rate can vary widely, depending on the shape, size, and density of the solid particles, the design of the fluidized bed, gas viscosity, and other factors. The solid particles in the fluidized bed can have properties and characteristics of a normal fluid, such as the ability to free flow under gravity, and/or to be pumped using fluid type technologies.

In some embodiment of the disclosure, the carrier gas inlet 110 is in fluid communication with a carrier gas source (not shown) that can provide a high volumetric flow of carrier gas to the exemplary vapor delivery apparatus 100 of FIG. 1. The carrier gas may comprise one or more inert gases or non-inert gases. Examples of inert carrier gases can include, but are not limited to, argon (Ar), nitrogen (N$_2$), helium (He), or a combination of two or more of the foregoing. In certain embodiments, a non-inert carrier gas, such as, for example, oxygen (O$_2$) can be used as an alternative to an inert gas. In some embodiments, a carrier gas can be selected that does not react with the plurality of solid precursor particles at the temperature and pressure in the fluidized bed region 104. In some embodiments, the carrier gas supplied from the carrier gas source may have a flow rate that enables the formation and maintenance of a fluidized bed in the fluidized bed region 104. The flow rate needed to form and maintain a fluidized bed may vary based on the type of solid precursor particles in the fluidized bed region 104. For example, some particles that have a higher weight, such as hafnium chloride (HfCl$_4$), may require a higher flow rate than other particles having a lesser weight, such as zirconium chloride (ZrCl$_4$), assuming particle sizes of approximately equal dimensions.

In some embodiments, the carrier gas is introduced into fluidized bed region 104 via the distributor plate 112. The distributor plate 112 can serve to support the plurality of solid precursor particles when in a static state prior to fluidization. In addition, the distributor plate 112 allows a carrier gas to flow therethrough and into the vessel interior in an upward direction (as indicated by carrier gas flow directional arrow 132). The distributor plate 112 can include a plurality of apertures (not shown) that are smaller in size than the particles of solid precursor in order to prevent the solid precursor particles from passing therethrough. In addition, the plurality of apertures comprising the distributor plate 112 can be configured and distributed to allow a velocity of carrier gas that exceeds the minimum fluidization velocity as well as providing a uniform high velocity carrier gas flow across the entire cross sectional area of the fluidized bed region 104. The distributor plate 112 may comprise a solid plate with a plurality of machined apertures, or alternatively a porous frit may be employed as the distributor plate 112. In some embodiments, the carrier gas inlet 110 and the distributor plate 112 are disposed upstream of the fluidized bed region 104.

In some embodiments, the exemplary vapor delivery apparatus 100 can include a filter 114 which is employed to prevent solid precursor particles from escaping the vessel 102. The filter 114 can include opening that are smaller than the plurality of precursor particles 108. In other embodiments, the filter 112 may be omitted, and a filter may be positioned outside of the vapor delivery system 100, for example, prior to the precursor inlet of a reaction chamber (not shown) in fluid communication with the vapor delivery apparatus 100. Therefore, in some embodiments of the disclosure, the vapor delivery apparatus 100 may further comprise a filter 112 disposed downstream of the fluidized bed region 104 and configured to filter solid precursor particles from the generated precursor.

The exemplary vapor delivery apparatus 100 may further include a precursor gas outlet 116 which serves as an outlet for an evaporated gaseous precursor formed from the plurality of solid precursor particles 108 disposed within the vessel interior 106. In some embodiments, the precursor gas outlet 116 is in fluid communication with a reaction chamber via a gas line. The precursor gas outlet 116 may be provided with an optional monitoring device 134 configured to measure and/or control the concentration of precursor entrained within the generated gaseous precursor. For example, the precursor concentration monitoring device 134 may comprise an infrared or ultraviolet sensor.

In some embodiments, the vapor delivery apparatus 100 can further include a heating system 118 configured for heating the fluidized bed region 104 within the vessel interior 106. In more detail, the heating system 118 serves to heat the fluidized bed region 104 and the plurality of solid precursor particles 108 disposed therein to a temperature at which vaporization of the solid precursor particles is facilitated. The heating system 118 may comprise a radiant and/or resistive heater. In the illustrated embodiment shown in FIG. 1, a resistive wire helically winds around the vessel sidewall 126. In other embodiments, the heating system may include heater rods or other internal heating mechanisms that are positioned inside the vessel interior 106. In yet other embodiments, the vapor delivery system 100 may include a heating system disposed between the distributor plate 112 and the carrier gas inlet 110. In further embodiments, the vapor delivery apparatus 100 may use induction, microwave, and/or light to heat the fluidized bed region 104 within the vessel interior 106. In some embodiments, a combination of the foregoing or various other types of heaters and heating systems can be adapted for heating the fluidized bed region 104 and the plurality of solid precursor particles 108 disposed therein. Whether the heating system 118 heats the vessel wall 126 or more directly heats the fluidized bed region 104, the fluidized bed region 104 facilitates efficient distribution of heat to the plurality of solid precursor particles 108. The high surface area of the heated solid precursor particles facilitates efficient vaporization rates and greater ease of saturation of the carrier gas within the vaporized precursor.

In some embodiments, the vapor delivery apparatus 100 of FIG. 1 also includes a pressure sensing system. An exemplary pressure sensing system is illustrated FIG. 1 and may comprise a first pressure sensor 136 and a second pressure sensor 138, as well communication links (illustrated by double lines 140 and 142). Communication links 140 and 142 may comprise electrical, optical, or other means for conveying information back forth between the pressure control system and a controller 150. In alternative embodiments, the communication links 140 and 142 may be omitted and communication between the pressure sensing system and the controller 150 may be performed wireless. The pressure sensing system can be constructed and arranged to generate a differential pressure signal ($\Delta P_s$) by monitoring a pressure drop ($\Delta P$) across the plurality of solid precursor particles when a carrier gas is passed upwards through the plurality of solid particles at a flow rate above the minimum fluidization flow rate to form a fluidized bed within the fluidized bed region 104.

In more detail, the weight of the remaining solid particles within the fluidized bed can be determined by monitoring the pressure drop ($\Delta P$) across the fluidized bed. In brief, the pressure drop across the fluidized bed when the carrier gas flow is beyond that of the minimum fluidization velocity can be expressed by equation (1):

$$\Delta P = [M_s g / A][(\rho_s - \rho_f)/\rho_s] \qquad \text{I}$$

where $\Delta P$ is the pressure drop across the fluidized bed, $M_s$ is the total remaining mass of solids in the fluidized bed, g is the acceleration due to gravity, A is the cross-sectional area of the fluidized bed, $\rho_s$ is the apparent density of the solid particles, and $\rho_f$ is the density of the fluidizing fluid (i.e., the carrier gas). In the embodiments of the present disclosure the carrier gas density is minimal compared with the density of the solid particles, therefore the second term in equation (1) can be disregarded. In addition, the term $M_s g$ is equal to the weight (W) of the remaining particles within the fluidized bed. Therefore the pressure drop ($\Delta P$) across the fluidized bed can be expressed by equation (II):

$$\Delta P = [W/A] \qquad \text{II}$$

Therefore, in the embodiments of the present disclosure, monitoring the pressure drop ($\Delta P$) across the fluidized bed, and knowing the cross-sectional area of the fluidized bed (A), i.e., the cross sectional area of the fluidized bed region 104, allows for determination of the remaining weight of the solid precursor particles within the fluidized bed (W).

The pressure drop or differential pressure across the fluidized bed disposed within the vessel interior 106 may be determined by various means. In some embodiments of the disclosure, the pressure drop ($\Delta P$) across the fluidized bed can be determined and monitored by a pressure sensing system comprises two pressure sensors. As illustrated in FIG. 1, an exemplary vapor delivery system 100 of the present disclosure may comprise a pressure sensing system comprising two pressure sensors, a first pressure sensor 136 disposed upstream of the fluidized bed region 104, and a second pressure sensor 138 disposed downstream of the fluidized bed region 104. The first pressure sensor 136 and the second pressure sensor 138 may comprise one or more or a piezoelectric pressure sensor, a capacitive pressure sensor, a manometer etc. It should be appreciated that the locations of the first and second pressure sensors (136, 138) illustrate in FIG. 1 are exemplary and alternative embodiments of the disclosure may location the first and second pressure sensor in alternative locations whilst still enable measurement of the pressure drop ($\Delta P$) across the fluidized bed. For example, the first pressure sensor 136 alternatively can be located within the vessel 102 upstream of the distributor plate 112 and the second pressure sensor 138 alternative can be located within the vessel 102 downstream of the filter 114.

Figure 2:
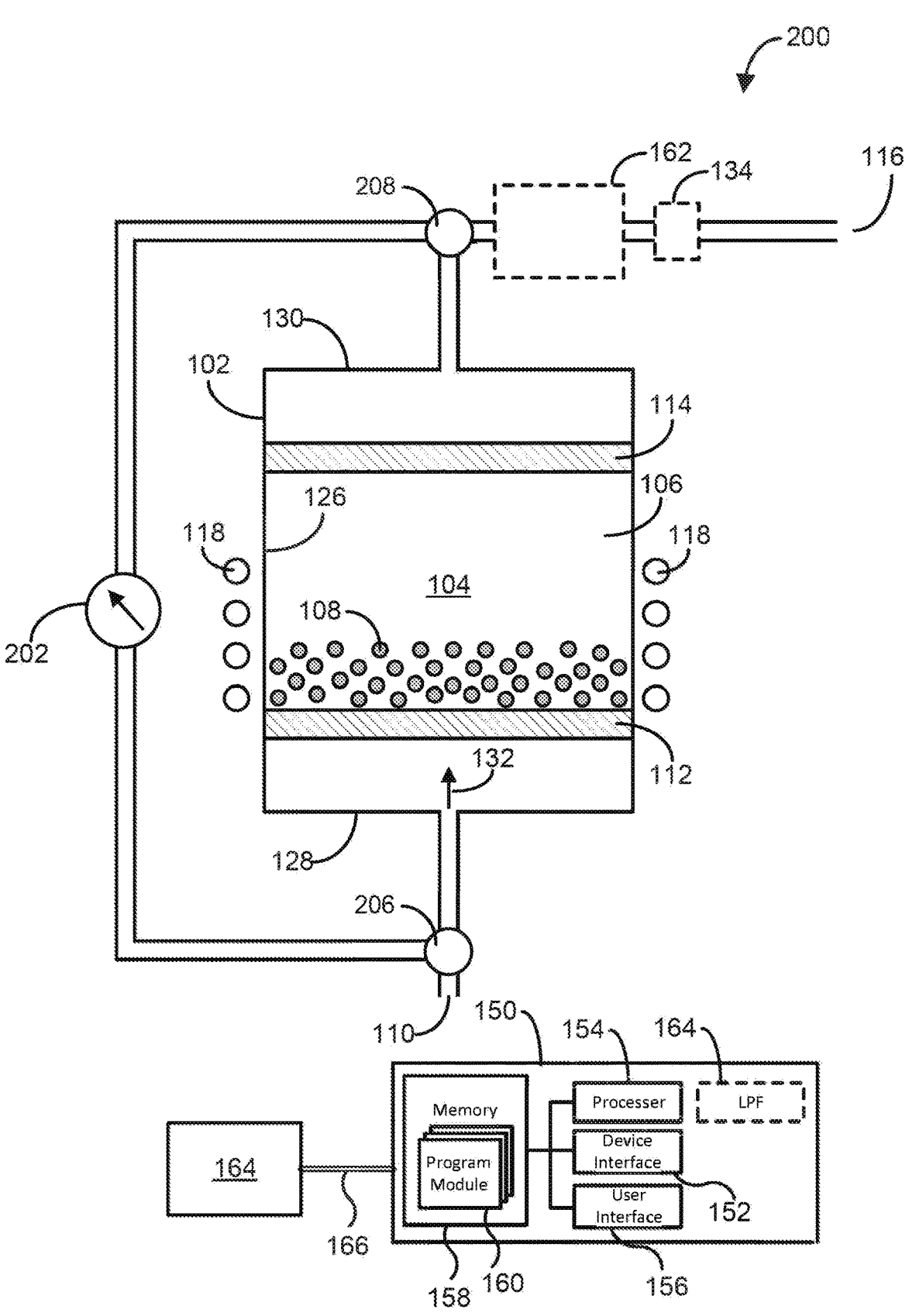
FIG. 2 illustrates a further exemplary vapor delivery apparatus in accordance with exemplary embodiments of the disclosure.

In alternative embodiments of the disclosure, the pressure drop ($\Delta P$) across the fluidized bed disposed within the vessel interior 106 may be determined by employing a differential pressure sensor. FIG. 2 illustrates a further exemplary vapor delivery system 200 of the present disclosure. The vapor delivery system 200 of FIG. 2 may be similar to that of vapor delivery system 100 except that the two pressure sensors of vapor delivery system 100 (namely pressure sensors 136 and 138) are replaced by a single differential pressure sensor 202 (which i this exemplary embodiments is wireless linked to controller 150). Therefore, in some embodiments the disclosure, a pressure sensing system comprises a differential pressure sensor 202. As a non-limiting example, the differential pressure sensor 202 may comprise two ports, a first port 206 fluidly coupled upstream of the fluidized bed region 104 and a second port 208 fluidly coupled downstream of the fluidized bed region 104. In some embodiments, the differential pressure sensor 202 may comprise at least one of a piezoresistive sensor, a capacitive sensor, and a microelectromechanical (MEMS) sensor. As previously described with regard to vapor delivery apparatus 100 (FIG. 1), the locations of the first and second ports (206, 208) given in FIG. 2 are exemplary and alternative locations can be employed to determine the differential pressure across the fluidized bed.

The vapor delivery apparatus of the present disclosure (exemplified by apparatus 100 of FIG. 1 or apparatus 200 of FIG. 2) may further comprise a control system 150. In some embodiments, the control system 150 can be constructed and arranged to receive a differential pressure signal ($\Delta P_s$) from the pressure sensing system and calculate a remaining weight (W) of the plurality of solid precursor particles within the fluidized bed region based on a direct proportional relationship between the differential pressure ($\Delta P$) and the remaining weight of the plurality of solid precursor particles as given by equation (II) described herein above.

In more detail, the control system 150 may comprise a component or subsystem of the vapor delivery apparatus or alternatively may comprise a component or subsystem of a vapor phase reactor employing the vapor delivery apparatus of the present disclosure, i.e., the control system 150 may comprise a reactor control system that is configured to control not only the vapor delivery apparatus but can also be configured to control and operate an entire vapor phase reactor including the vapor delivery apparatus of the present disclosure, as described in greater detail herein below.

In some embodiments of the disclosure, the controller 150 includes a device interface 152, a processor 154, a user interface 156 and a memory 158. The device interface 152 connects the processor 154 to the communication links 140, 142, (or alternative is linked wirelessly to the pressure sensors). The processor 154 is operably connected to the user interface 156 (e.g., to receive user input and/or provide user output therethrough) and is disposed in communication with the memory 158. The memory 158 includes a non-transitory machine-readable medium having a plurality of program modules 160 recorded thereon containing instructions that, when read by the processor 154, cause the processor 154 to execute certain operations. As will be appreciated by those of skill in the art in view of the present disclosure, the controller 150 may have a different arrangement in other examples and remain within the scope of the present disclosure.

It should be noted, that the control system 150 can also include other components necessary for controlling the operation of the vapor delivery systems 100 and 200. For example, the control system 150 can be configured to communicate with a pressure sensing system comprising one or more pressure sensors, such as, the first pressure sensor 136 and second pressure sensor 138 of apparatus 100 (via communication links or via wireless communication), or alternatively the differential pressure 202 of apparatus 200 (via communication link or via wireless communication). In particular, the control system 150 can be configured to receive a differential pressure signal ($\Delta P_s$) from a pressure sensing system from which the control system 150 can calculate the remaining weight of the fluidized bed disposed with the vapor delivery apparatus 100 or the vapor delivery apparatus 200. For example, the control system 150 can calculate the remaining weight of the solid precursor particles within the fluidized bed region utilizing equation (II) and knowing the cross sectional area of the fluidized bed region (A) and the momentary differential pressure ($\Delta P$) provided by the pressure sensing system.

The vapor delivery apparatus of the present disclosure may also include means for reducing unwanted fluctuations in the differential pressure signal ($\Delta P_s$) generated by a pressure sensing system. For example, in some embodiments of the disclosure, the vapor delivery apparatus 100 (or alternatively vapor delivery apparatus 200), may further comprise a low-pass filter (LPF), the low-pass filter being configured to reduce the fluctuations in the differential pressure signal ($\Delta P_s$) generated by the pressure sensing system. As a non-limiting example, a low-pass filter may comprise an option buffer volume 162 disposed downstream of the vessel 102 and configured to smooth the pressure fluctuations across the fluidized bed disposed within the vessel 102. In some embodiments, a low-pass filter may comprise a subcomponent of the control system 150, such as, for example, an electrical circuit 164 configured to operate as a low-pass filter within the control system 150. In additional embodiments, a software based low-pass filter may be employed to operate and run from the control system 150. Therefore, the vapor delivery apparatus of the present disclosure may comprise a low-pass filter including one or more of a mechanical low-pass filter, an electrical low-pass filter, or a software based low-pass filter, the software based low-pass filter being stored, run, and operated from the control system 150.

The vapor delivery apparatus (100 or 200) of the present disclosure can also include an alert system 164 linked to the control system 150, for example via an exemplary communication link 166 or via wireless communication. In some embodiments, the alert system 160 can be linked to the control system 150 and can be configured to be activated by an alert signal generated from the control system 150. In alternative embodiments, the alert system 160 may comprise a subcomponent of the control system 150.

In some embodiments, the alert system 160 can be activated by the control system 150 (or subsystem of the control system 150) when the control system 150 determines that the remaining weight (W) of solid precursor particles within the fluidized bed region 104 has reached a predetermined minimum value. In some embodiments, the alert system 160 can be activated to prevent operation of the vapor delivery apparatus 100/200 upon determining the remaining weight of the solid precursor particles within the vessel 102 is insufficient for completing a scheduled process. In other embodiments, the alert system 160 can be activated to initiate additional operational functions of the vapor delivery apparatus 100/200 upon determining the remaining weight of the solid precursor particles within the vessel 102 has reached a predetermined minimum value. For example, upon activating the alert system 160 in response to a predetermined minimum weight of solid precursor particles within the fluidized bed region, the solid source within the vessel 102 may be replenished to enable continued delivery of precursor from the vapor delivery apparatus 100/200.

The embodiments of the present disclosure can also include vapor phase reactors configured for vapor processing of substrate, and in particular vapor phase reactors employing the vapor delivery system described herein.

Therefore, the embodiments of the disclosure include a vapor phase reactor configured for vapor processing of substrates. The vapor phase reactor can include, a vapor delivery apparatus comprising, a carrier gas inlet, a fluidized bed region disposed within an inner volume of the vapor delivery apparatus, wherein the fluidized bed region is constructed and arranged to allow a carrier gas to lift and stir a plurality of solid precursor particles to form a fluidized bed, a heater configured to heat the fluidized bed region, a precursor gas outlet disposed downstream of the fluidized bed region, and a pressure sensing system constructed and arranged to monitor a pressure drop ($\Delta P$) across the fluidized bed and generate a differential pressure signal ($\Delta P_s$) from said pressure drop. The vapor phase reactor of the present disclosure can also include a vapor phase reaction chamber in fluid communication with the vapor delivery apparatus, wherein the vapor phase reaction chamber is configured to receive a gaseous precursor generated in the vapor delivery apparatus. The vapor phase reactor can also include, a reactor control system constructed and arranged to receive the differential pressure signal ($\Delta P_s$) from the pressure sensing system and calculate a remaining weight of the fluidized bed. The vapor phase reactor may further comprise, an alert system linked to the reactor control system, wherein the alert system is configured to be activated by a signal generated from the reactor control system when the weight of the fluidized bed reaches a predetermined minimum value.

Figure 3:
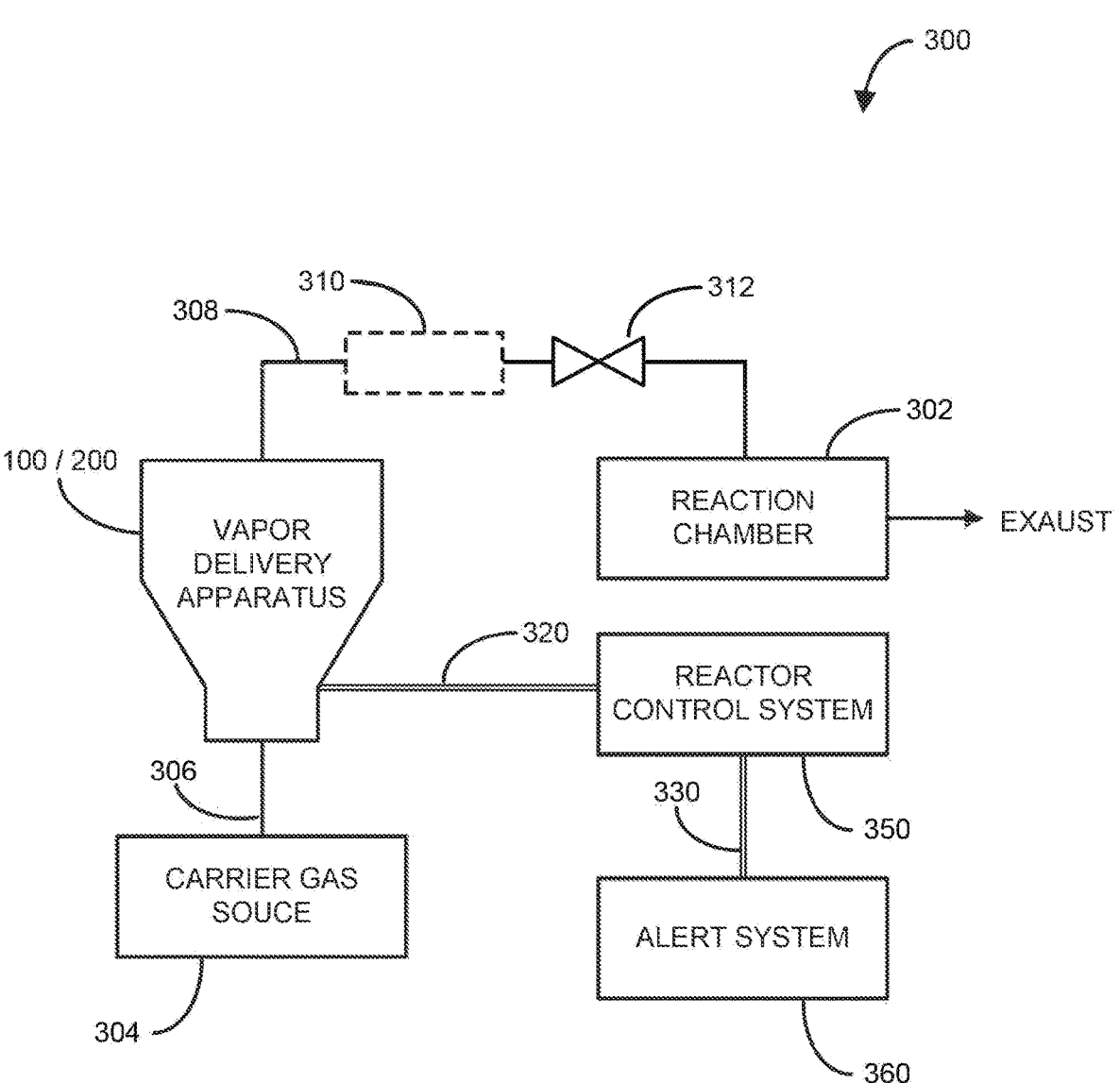
FIG. 3 illustrate an exemplary vapor phase reactor employing a vapor delivery apparatus in accordance with exemplary embodiments of the disclosure.

In more detail, FIG. 3 illustrates an exemplary vapor phase reactor 300 which includes a vapor delivery apparatus 100/200 as described previously herein with reference to FIG. 1 and FIG. 2. Various details relating to the vapor delivery system 100/200, the reactor control system 314, and the alert system 316, have previously been described in detail herein and therefore are only briefly reviewed below with reference to the exemplary vapor phase reaction 300.

Therefore, in some embodiments of the disclosure, the exemplary vapor phase reactor 300 includes a vapor delivery system 100/200 which is configured for generating a gaseous precursor from a fluidized bed of solid precursor particles. The illustrated vapor phase reactor 300 further includes a reaction chamber 302, a carrier gas source 304, a carrier gas line 306, a gaseous precursor gas line 308, an optional buffer volume 310, and a gasflow control valve 312. The vapor phase reactor 300 can also include a reactor control system 350 configured for controlling the operation of the vapor phase reactor 300, including, in some embodiments, operation and control of the vapor delivery apparatus 100/200, and an alert system 360. In particular, the reactor control system 350 is in communicate with both the vapor delivery apparatus 100/200 (via exemplary communication link 320 or alternatively via wireless communication) and the alert system 360 (via exemplary communication link 330 or alternative via wireless communication) such that an alert signal can be generated upon a reaching a predetermined minimum weight of solid source precursor remaining within the vapor delivery system 100/200.

In some embodiments, the reaction chamber 302 defines a reaction space in which one or more substrates can be processed. The reaction chamber 302 can be batch-type chamber that can process multiple substrate simultaneously, or a single-wafer chamber. The reaction chamber 302 may operate continuously, and precursor supply for the vapor delivery apparatus 100/200 can be refreshed or recharged on the fly or between deposition runs. In some embodiments, the reaction chamber 302 may be a chemical vapor deposition (CVD) reaction chamber or an atomic layer deposition (ALD) reaction chamber. In certain embodiments, the reaction chamber 302 may also be configured to provide in-situ or remote plasma. It should be noted that various types of reaction chamber can be adapted for use as the chamber for use in combination with the vapor delivery apparatus as described herein.

In some embodiment of the disclosure, an additional solid precursor container (not shown) can be employed to replenish solid precursor particles to the vapor delivery apparatus 100/200. In some embodiments, a plurality of solid precursor particles can be provided to the vapor delivery apparatus 100/200 between operations or deposition runs. In other embodiments, a plurality of solid precursor particles can be continuous supplied to the vapor delivery apparatus 100/200 to enable continuous bulk refill of the solid source. In other embodiments, the provision of additional solid precursor particles to the vapor delivery apparatus may be triggered and controlled by the pressure sensing system in conjunction with both the reactor control system 350 and the alert system 360.

The carrier gas source 304 can be configured to provide a high volumetric flow of a carrier gas (at or above the minimum fluidization flow rate) to the vapor delivery apparatus 100/200 via carrier gas line 306 to enable the formation of a fluidized bed within the vapor delivery apparatus 100/200. The carrier gas may comprise inert or non-inert gases as previously described. In some embodiments, the reactor control system 350 can be configured to control the carrier gas flow rate, pressure, and other parameters within the vapor delivery apparatus to enable formation and control of a fluidized bed within the vapor delivery apparatus 100/200.

The gaseous precursor line 308 serves as a passage for the vaporized gaseous precursor generated from the vapor delivery apparatus 100/200 to be delivered to the reaction chamber 302. The gaseous precursor line 308 is in fluid communication with the reaction chamber 302 and the vapor delivery apparatus 100/200.

In some embodiments, the gaseous precursor line 308 may include an optional buffer volume 310 which can be configured to act as a low-pass filter to reduce fluctuations in the differential pressure signal generated by the vapor delivery apparatus 100/200. The optional buffer volume 310 may be utilized in addition to the various low-pass filter mechanisms employed within the vapor delivery apparatus 100/200 (as described with reference to FIG. 1 and FIG. 2), or alternative the optional low-pass filter mechanisms of the vapor delivery apparatus 100/200 may be omitted and the optional buffer volume 310 (FIG. 3) may be employed singularly as the low-pass filter mechanism for the smoothing the differential pressure signal. In addition, the optional buffer volume 310 can be configured to hold and subsequently provide a high volume and/or flow of the gaseous precursor to the reaction chamber 302 when required. In some embodiments, the gaseous precursor line 308 may be heated to prevent condensation and it will be noted that various heating and control configurations are possible to enable optimal performance of gaseous precursor flow to the reaction chamber from the vapor delivery apparatus 100/200.

The exemplary vapor phase reactor 300 may further comprise a gas flow control valve 312 which can serve to control the flow of the generated gaseous precursor into the reaction chamber 302. The gas flow control valve 312 may also shut off flow of the gaseous precursor into the reaction chamber 302. Various suitable gas valves can be employed and controlled by the reactor control system 350.

In some embodiment, exemplary vapor phase reactor 300 includes the reactor control system 350, which serves to control the operation of the vapor phase reactor 300. The reactor control system 350 of vapor phase reactor 300 may be similar or the same as controller 150 of FIG. 1 but is shown here in a simplified form. The reactor control system 350 may control the operation of one or more of the reaction chamber 302, the vapor delivery apparatus 100/200, the carrier gas source 304, the carrier gas lines, and the precursor gas flow valve 312, and may communicate with all of the foregoing components, e.g., via exemplary communication links 320 and 330, or alternatively via wireless communication. It should be noted that various additional communication links between various components of the vapor phase reactor 300 and the reactor control system 350, and alert system 360 are not shown in the interest of brevity. In addition, the exemplary vapor phase reactor 300 as shown in FIG. 3 is illustrated in a simplified form to highlight the embodiments of the present disclosure and it should be understood that a multitude of additional components, gas lines, communication links, as well as other components, and subsystems, may be employed as is known in the fabrication of vapor phase reactors.

In some embodiments of the disclosure, the reactor control system 350 and the alert system 360 of the exemplary vapor phase reactor 300 of FIG. 3 may be similar to, and configured and operated as described with reference to the control system 150 and alert system 160 of vapor delivery apparatus 100/200 as described with reference to FIG. 1 and FIG. 2.

In some embodiments, the reactor control system 350 may comprise further additional control and operation sub-system to those described with reference to the control system 150, the additional control and operation subsystem being configured to enable operation of the entirety of the exemplary vapor phase reactor 300. In some embodiments, the control system 150 of the vapor delivery apparatus 100/200 (as described previously) may optional be omitted and control of the vapor delivery apparatus 100/200 may be achieved utilizing the reactor control system 350. In other embodiments, the exemplary vapor phase reactor 300 may comprise and employ both a control system 150 for the operation and control of the vapor delivery apparatus 100/200 in addition to the reactor control system 350 which may be configured to operate (in conjunction with control system 150) the entirety of the vapor phase reactor 300.

In some embodiments, the reactor control system 350 can be constructed and arranged to receive a differential pressure signal ($\Delta P_s$) from the vapor delivery apparatus 100/200. For example, reactor control system 350 can constructed and arranged to receive a differential pressure signal ($\Delta P_s$) from the pressure sensing system of the vapor delivery apparatus 100/200 and further the reactor control system 350 can calculate a remaining weight of the fluidized bed, as described in detail previously with reference to control system 150.

In additional embodiments, the reactor control system 350 may further include electrical circuitry (now shown) which operates as a low-pass filter configured to reduce fluctuations in a differential pressure signal generated by the vapor delivery system 100/200, the details of were described previously herein.

The exemplary vapor phase reactor 300 may also include an alert system 360 which in some embodiments, may be similar to, and configured and operated as described with reference to the alert system 164 of vapor delivery apparatus 100/200 as described with reference to FIG. 1 and FIG. 2. For example, the alert system 360 can be linked to the reactor control system (e.g. via a communication link 330), wherein the alert system 360 is configured to be activated by a signal generated from the reactor control system 350 when the weight of the fluidized bed reaches a predetermined minimum value (as previously described).

In some embodiments, the alert system 360 can be activated by the reactor control system 350 when the reactor control system 350 determines that the remaining weight (W) of solid precursor particles within the vapor delivery system 100/200 has reached a predetermined minimum value. In some embodiments, the alert system 360 can be employed to prevent operation of the vapor phase reactor and particularly the vapor delivery apparatus 100/200 upon determining the remaining weight of the solid precursor particles within the vapor delivery apparatus 100/200 is insufficient for completing a scheduled process. In other embodiments, the alert system 360 can be employed to trigger additional operational functions of the vapor phase reactor 300 and particularly the vapor delivery apparatus 100/200 upon determining the remaining weight of the solid precursor particles within the vapor delivery apparatus 100/200 has reached a predetermined minimum value. For example, upon activating the alert system 360 in response to a predetermined minimum weight of solid precursor particles within the vapor delivery apparatus, the solid source within the vapor deliver apparatus 100/200 may be replenished to enable continued delivery of precursor from the vapor delivery apparatus 100/200 to the reaction chamber 302.

Figure 4:
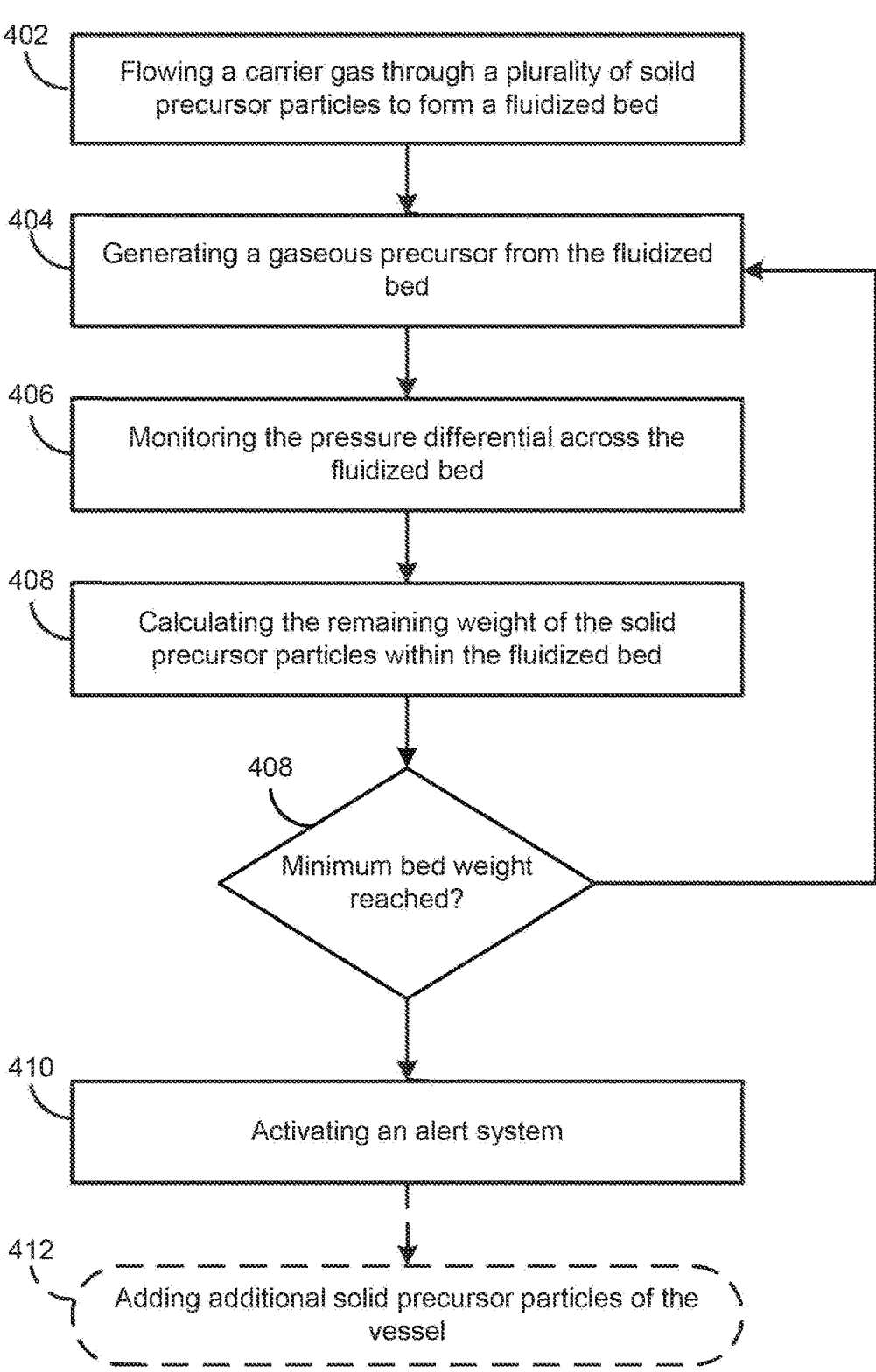
FIG. 4 illustrates an exemplary method for monitoring solid source depletion within in a vapor delivery apparatus in accordance with embodiments of the disclosure.

The embodiments of the present disclosure can also include methods for monitoring and a controlling a vapor delivery system. An exemplary method 400 is illustrated in FIG. 4 wherein the method includes, flowing a carrier gas upward through a plurality of solid source particles to form a fluidized bed with an initial bed weight (step 402). The carrier gas flow can be adjusted depending on the properties of the solid source particles, and the carrier gas flow can be set to a high flow rate at or beyond the minimum fluidization flow rate required to form and maintain a fluidized bed of the selected solid source particles.

Exemplary method 400 may further comprise, generating a gaseous precursor from the fluidized bed by vaporizing a portion of the plurality of the solid precursor particles (step 404). Vaporization of the solid precursor particles within the fluidized bed can be initiated and sustained by a heating system configured to heat the fluidized bed region within the vessel and in turn heat the solid precursor particles. In addition, the vaporization process may be partly controlled by the pressure within the vessel in which the fluidized bed is formed.

The method 400 may further comprise, monitoring the pressure differential ($\Delta P$) across the fluidized bed as the gaseous precursor is generated (step 406). For example, monitoring the differential pressure ($\Delta P$) across the fluidized bed may comprises monitoring the differential pressure ($\Delta P$) utilizing a pressure sensing system. In some embodiments, the pressure sensing system comprises at least two pressure sensors, a first pressure sensor disposed upstream of the fluidized bed and a second pressure sensor disposed downstream of the fluidized bed. In some embodiments, the pressure sensing system comprises a differential pressure sensor comprising two ports, a first port fluidly coupled upstream of the fluidized bed and a second port fluidly coupled downstream of the fluidized bed. The differential pressure ($\Delta P$) may be continuously monitored in real-time or alternatively the differential pressure ($\Delta P$) may be monitored at predetermined time intervals during the generation of the gaseous precursor.

Method 400 may further include, calculating the remaining bed weight within the fluidized bed as the bed weight reduces as a result of the vaporization of a portion of the plurality of solid source particles (step 408). For example, calculating the remaining bed weight within the fluidized bed as the bed weight reduces may be performed by a control system in communication with the pressure sensing system. The pressure sensing system, may either monitor the differential pressure ($\Delta P$) in continuously or at predetermined time intervals, and communicates the differential pressure ($\Delta P$) to the control system by a different pressure signal ($\Delta P_s$) generated from the pressure sensing system.

The control system can calculate the remaining bed weight based on equation (II) and the known cross sectional area (A) of the fluidized bed. For example, the device interface of the control system can provide said data (i.e., $\Delta P$ and A) to a processor which calculates the time varying remaining bed weight within the fluidized bed.

The method 400 may further employ one or more low-pass filters to reduce any undesirable fluctuations in the monitored differential pressure ($\Delta P$) and also the differential pressure signal ($\Delta P_s$). For example, in some embodiments, a low-pass filter may comprise at least one of a buffer volume disposed downstream of the source vessel, or an electrical circuit disposed within the control system, or a software based low-pass filter stored as a program and run from the control system.

The reactor control system 150 further includes a stored value for the minimum bed weight and upon reaching said minimum an alert system 360 can be activated. Therefore exemplary method 400 includes a decision gate 408, wherein the decision is based on the calculated value of remaining weight of solid precursor particles within the fluidized bed. If the calculated weight of remaining solid source particles is above the threshold minimum value then exemplary process 400 will continue to generate the gas precursor (step 404), whilst monitoring the pressure differential across the fluidized bed (step 406), and recalculating the remaining weigh of the sold precursor particles within the fluidized bed (408) based on the revised differential pressure signal ($\Delta P_s$). Once the calculated remaining weight of the solid precursor particles within the fluidized reaches or even drops below the predetermined value minimum then decision gate 408 will move to next process step shown as step 410. In step 410, the exemplary method 400 can proceed by activating an alert system when the remaining bed weigh is less than the predetermined minimum value (step 410). For example, the alert system can be activated by the control system upon determining the minimum weight of the solid precursor particles has been reached.

The action taken upon activating the alert system can be user, or process dependent. For example, in some embodiments, activating the alert system may be used to initiate a refill of the vapor delivery system with additional precursor particles, i.e., by supplying additional solid precursor particles to the vessel (optional step 412). In other embodiments, activating the alert system may discontinue gaseous precursor generation from the vapor delivery system. The activation of alert system may also be used to initiate a multitude of other processes or actions depending on the needs of the user or the needs of the process The example embodiments of the disclosure described above do not limit the scope of the invention, since these embodiments are merely examples of the embodiments of the invention, which is defined by the appended claims and their legal equivalents. Any equivalent embodiments are intended to be within the scope of this invention. Indeed, various modifications of the disclosure, in addition to those shown and described herein, such as alternative useful combinations of the elements described, may become apparent to those skilled in the art from the description. Such modifications and embodiments are also intended to fall within the scope of the appended claims.

What is claimed is:

1. A vapor delivery apparatus configured for converting a solid source material to a gaseous precursor for use in a vapor phase reactor, the apparatus comprising:

a vessel comprising a vessel interior;

a fluidized bed region disposed within the vessel interior, the fluidized bed region configured for containing a plurality of solid precursor particles;

a carrier gas inlet into the vessel interior;

a heating system configured for heating the fluidized bed region;

a pressure sensing system constructed and arranged to generate a differential pressure signal ($\Delta P_s$) by monitoring a pressure drop ($\Delta P$) across the plurality of solid precursor particles when a carrier gas flows upwards through the plurality of solid precursor particles to form a fluidized bed within the fluidized bed region, wherein the pressure sensing system comprises a first pressure sensor device disposed upstream of the fluidized bed region and a second pressure sensor device disposed downstream of the fluidized bed region to monitor the pressure drop across the plurality of solid precursor particles; and a control system constructed and arranged to receive the differential pressure signal ($\Delta P$) from the pressure sensing system and calculate a remaining weight (W) of the plurality of solid precursor particles within the fluidized bed region.

2. The apparatus of claim 1, wherein the first pressure sensor device comprises a first pressure sensor disposed upstream of the carrier gas inlet and the second pressure sensor device comprises a second pressure sensor disposed downstream of the vessel interior.

3. The apparatus of claim 1, wherein the pressure sensing system comprises a differential pressure sensor wherein the first pressure sensor device comprises a first port and the second pressure sensor device comprises a second port.

4. The apparatus of claim 1, further comprising an alert system linked to the control system, wherein the alert system is configured to be activated by an alert signal generated from the control system when the remaining weight of the plurality of solid precursor particles within the vessel interior reaches a predetermined minimum value.

5. The apparatus of claim 1, further comprising a low-pass filter configured to reduce fluctuations in the differential pressure signal ($\Delta P_s$).

6. The apparatus of claim 5, wherein the low-pass filter comprises at least one of a buffer volume disposed downstream of the vessel interior, or an electrical circuit disposed within the control system.

7. The apparatus of claim 1, further comprising a distribution plate disposed upstream of the fluidized bed region, wherein the carrier gas inlet is disposed upstream of the distribution plate.

8. The apparatus of claim 1, further comprising a filter disposed downstream of the fluidized bed region and configured to filter solid precursor particles from the gaseous precursor generated from the plurality of solid precursor particles.

9. A vapor phase reactor in fluid communication with the vapor delivery apparatus of claim 1.

10. A vapor phase reactor configured for vapor processing of substrates, comprising:

a vapor delivery apparatus comprising;

a carrier gas inlet;

a fluidized bed region disposed within an inner volume of the vapor delivery apparatus, the fluidized bed region constructed and arranged to allow a carrier gas to lift and stir a plurality of solid precursor particles to form a fluidized bed;

a heater configured to heat the fluidized bed region;

a precursor gas outlet disposed downstream of the fluidized bed region;

a pressure sensing system constructed and arranged to monitor a pressure drop ($\Delta P$) across the fluidized bed and generate a differential pressure signal ($\Delta P$) from said pressure drop, wherein the pressure sensing system comprises a first pressure sensor disposed upstream of the fluidized bed region and a second pressure sensor disposed downstream of the fluidized bed region; and a vapor phase reaction chamber in fluid communication with the vapor delivery apparatus, wherein the vapor phase reaction chamber is configured to receive a gaseous precursor generated in the vapor delivery apparatus;

a reactor control system constructed and arranged to receive the differential pressure signal ($\Delta P_s$) from the pressure sensing system and calculate a remaining weight of the fluidized bed; and an alert system linked to the reactor control system, wherein the alert system is configured to be activated by a signal generated from the reactor control system in response to the weight of the fluidized bed reaching a predetermined minimum value.

11. The vapor phase reactor of claim 10, further comprising a low-pass filter configured to reduce fluctuations in the differential pressure signal ($\Delta P$).

12. The vapor phase reactor of claim 11, wherein the low-pass filter comprises at least one of a buffer volume disposed downstream of the inner volume, or an electrical circuit disposed within the reactor control system.

13. A method for monitoring and controlling a vapor delivery system, the method comprising:

flowing a carrier gas upward through a plurality of solid source particles within an inner volume of a vessel to form a fluidized bed comprising a bed weight;

generating a gaseous precursor from the fluidized bed by vaporizing a portion of the plurality of solid source particles;

monitoring a pressure differential ($\Delta P$) across the fluidized bed as the gaseous precursor is generated by sensing a first pressure upstream of the fluidized bed and a second pressure downstream of the fluidized bed;

calculating a remaining bed weight within the fluidized bed as the bed weight reduces as a result of the vaporization of a portion of the plurality of solid source particles; and activating an alert system in response to the remaining bed weight being less than a predetermining minimum value.

14. The method of claim 13, wherein monitoring the pressure differential ($\Delta P$) across the fluidized bed comprises monitoring the pressure differential ($\Delta P$) utilizing a pressure sensing system.

15. The method of claim 14, wherein the pressure sensing system comprises at least two pressure sensors, a first pressure sensor disposed upstream of the fluidized bed and a second pressure sensor disposed downstream of the fluidized bed.

16. The method of claim 14, wherein the pressure sensing system comprises a differential pressure sensor comprising two ports, a first port fluidly coupled upstream of the fluidized bed and a second port fluidly coupled downstream of the fluidized bed.

17. The method of claim 14, further comprising employing a low-pass filter to reduce any fluctuations in the monitored pressure differential ($\Delta P$).

18. The method of claim 17, wherein the low-pass filter comprises at least one of a buffer volume disposed downstream of the inner volume, or an electrical circuit disposed within a control system in communication with the pressure sensing system.

19. The method of claim 13, wherein calculating the remaining bed weight within the fluidized bed as the bed weight reduces is performed by a control system in communication with the pressure sensing system.

20. The method of claim 13, wherein activating the alert system initiates one or more further processes, said processes comprising, at least one of, initiating a refill of the inner volume of the vessel with additional solid precursor particles, or discontinuing gaseous precursor generation.

* * * * *